(12) United States Patent
Freis

(10) Patent No.: US 9,151,307 B2
(45) Date of Patent: Oct. 6, 2015

(54) ASSEMBLY JOINED BY A FLOW DRILL SCREW

(71) Applicant: Ford Global Technologies, LLC, Dearborn, MI (US)

(72) Inventor: Amanda Kay Freis, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/487,203

(22) Filed: Sep. 16, 2014

(65) Prior Publication Data

US 2015/0003933 A1    Jan. 1, 2015

Related U.S. Application Data

(62) Division of application No. 13/363,453, filed on Feb. 1, 2012, now Pat. No. 8,857,040.

(51) Int. Cl.
*F16B 5/02* (2006.01)
*B21J 5/06* (2006.01)
*F16B 35/00* (2006.01)
*F16B 25/00* (2006.01)
*F16B 25/10* (2006.01)

(52) U.S. Cl.
CPC . *F16B 5/02* (2013.01); *B21J 5/066* (2013.01); *F16B 35/00* (2013.01); *F16B 25/0021* (2013.01); *F16B 25/106* (2013.01); *Y10T 29/49837* (2015.01); *Y10T 29/49963* (2015.01)

(58) Field of Classification Search
CPC .................................................. B23P 19/062
See application file for complete search history.

(56) References Cited

U.S. PATENT DOCUMENTS

| | | | |
|---|---|---|---|
| 5,361,478 A * | 11/1994 | Grossberndt et al. | ........ 29/432.2 |
| 7,626,106 B2 | 12/2009 | Stannard | |
| 8,110,152 B2 | 2/2012 | Schultz et al. | |
| 2008/0222873 A1 | 9/2008 | Draht et al. | |
| 2010/0183404 A1 | 7/2010 | Draht et al. | |
| 2010/0275669 A1 | 11/2010 | Vollet et al. | |

FOREIGN PATENT DOCUMENTS

WO      WO 2010121841 A1 *  10/2010

OTHER PUBLICATIONS

Weber Screwdriving Systems Inc., Weber RSF Flow Drill Screwdriving, www.weberusa.com.
Assembly Magazine, How to Master the Joining of Sheet Metals, May 18, 2011.
Hans-Wolfgang Seeliger, Manufacture of Aluminum Foam Sandwich (AFS) Components, Advanced Engineering Materials 2002, 4, No. 10, pp. 753-758.

* cited by examiner

*Primary Examiner* — Moshe Wilensky
(74) *Attorney, Agent, or Firm* — Raymond L. Coppiellie; Brooks Kushman P.C.

(57) ABSTRACT

An assembly including a plurality of parts fastened together with a flow drill screw. An indentation is formed on one side of a first part and a second part is assembled into engagement with the side of the first part with the indentation facing the second part. The flow drill screw is inserted through the indentation and material is displaced from the part into the indentation. Two or more panels or parts may be joined by aligning a flow drill screw with the indentations that are formed by embossing one or more panels.

2 Claims, 3 Drawing Sheets

ASSEMBLY JOINED BY A FLOW DRILL SCREW

CROSS-REFERENCE TO RELATED APPLICATIONS

This application is a division of U.S. application Ser. No. 13/363,453 filed Feb. 1, 2012, now U.S. Pat. No. 8,857,040 issued Oct. 14, 2014, the disclosure of which is hereby incorporated in its entirety by reference herein.

TECHNICAL FIELD

This disclosure relates to an assembly of parts fastened together with a flow drill screw.

BACKGROUND

Flow drill screwing is a one-sided joining technique that can be utilized to secure lightweight materials and dissimilar materials together. Many other mechanical fastening technologies, such as self-piercing rivets or clinching, are two sided joining methods, and hence require greater access to the components for joining. Regardless of the joining method, it is desirable to have mating parts flush and avoid or minimize gaps between the parts to insure a robust and high quality joint.

Flow drill screwing joins parts together by inserting the screw directly onto the surface of the assembly. The screw is rotated at a high speed of, for example, 3000-5000 rpm and a force in the range of to two to four kilo-newtons to cause localized heating of the components for joining. After sufficient heating, the screw penetrates the surface and an extruded boss is formed on the opposite side of the joint. The tip of the screw is then rotated at a lower speed of, for example, 500 to 2000 rpm to create a thread rolled surface. The speed of rotation is then further reduced to drive the screw to the seated position.

While the flow drill screwing process may be performed with or without a clearance hole, when parts are joined without a clearance hole, material tends to flow into the area between the parts. Material that flows into the area between the parts can cause separation of mating parts from each other. Hence, a gap may be created between the parts as a result of the material that flows between the parts that are joined together. Such gaps between the joined parts are likely objectionable.

This disclosure is directed to the above problems and other problems encountered when joining parts together in a flow drill screwing process particularly when no clearance hole exists prior to performing the flow drill screwing process.

SUMMARY

According to one aspect of this disclosure, a pre-assembly is provided that includes a first part that is an uninterrupted plate that does not include a pilot hole, a second part that is an uninterrupted plate that does not include a pilot hole, and a flow drill screw oriented for insertion into the first part at a location, wherein one of the first part and the second part define an embossed void on an internal side that faces the other of the first part or second part, and wherein the embossed void is aligned with the flow drill screw.

According to other aspects of the pre-assembly, the embossed void may be provided on the first part. Alternatively, the embossed void may be provided on the second part. The embossed void may include two embossed voids with a first embossed void provided on the first part and a second embossed void provided on the second part. Instead of an embossed void, the void could be formed by machining to remove material from the void area.

According to another aspect of the disclosure, an assembly is provided that comprises a first part having a first facing surface, a second part having a second facing surface that is assembled against the first facing surface of the first part, and a flow drill screw extending through the first part and the second part. One of the first and second parts defines a void between the parts through which the flow drill screw is inserted and, wherein material from the first part is transferred into the void when the flow drill screw is inserted through the first part.

According to other aspects of the disclosure, the assembly may further comprise a third part that is assembled to a first facing surface of the second part. The third part may define a void between the second part and the third part. The void may be defined by the first part and/or the second part.

The above aspects of the disclosure and other aspects will be better understood in view of the attached drawings and detailed description of the illustrated embodiments.

DETAILED DESCRIPTION

A detailed description of the illustrated embodiments of the present invention is provided below. The disclosed embodiments are examples of the invention that may be embodied in various and alternative forms. The figures are not necessarily to scale. Some features may be exaggerated or minimized to show details of particular components. The specific structural and functional details disclosed in this application are not to be interpreted as limiting, but merely as a representative basis for teaching one skilled in the art how to practice the invention.

Figure 1:
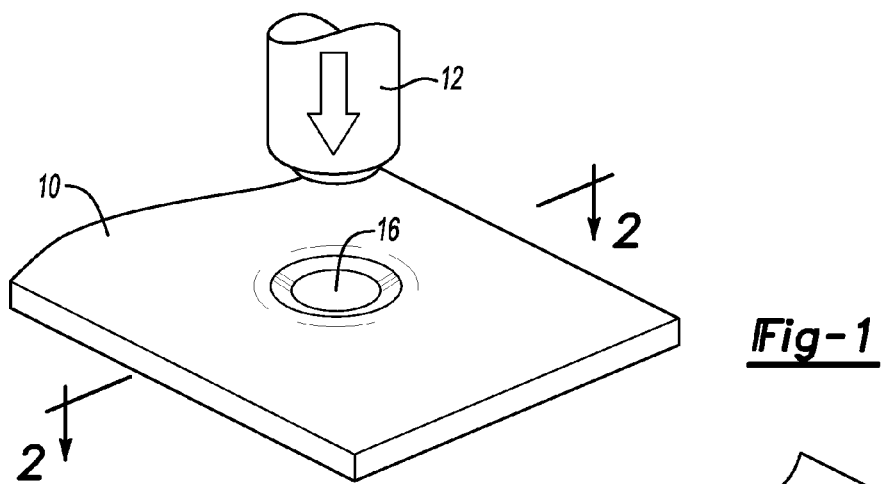
FIG. 1 is a fragmentary perspective view of an embossing tool and a part after an area of the part is embossed.

Referring to FIG. 1, an embossed panel 10, or part, is shown with a embossing tool 12 used to form an indentation 16 on the embossed panel 10. As used herein, the term "embossed" refers to forming an indentation in the surface of an object such as a panel 10, or part. While the term "debossed" could be used to refer to an indentation that is inverted, for simplicity, the term embossed is used for either case. Further, the terms "top" and "lower" are used to refer to the parts and surfaces as illustrated and it should be understood that the parts may be arranged in any orientation in actual production, such as sideways, angularly oriented, or even inverted with the first part being above the second part.

Figure 2:
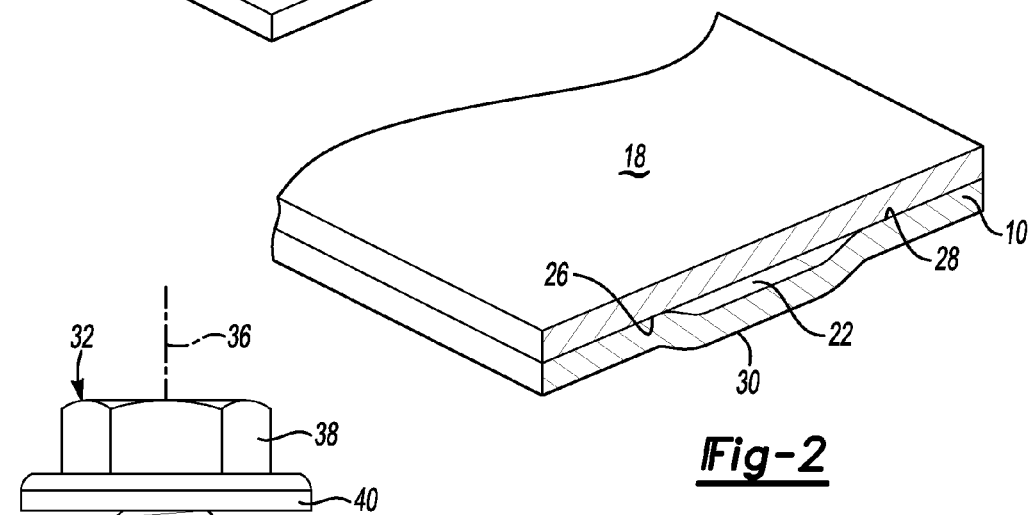
FIG. 2 is a fragmentary cross-section perspective view of two parts assembled together with a void, or indentation, formed by embossing one of the parts.

Referring to FIG. 2, the embossed panel 10 is shown with a flat panel 18 that are assembled together to define a void 22 in the location of the indentation 16. A first facing surface 26 of the flat panel 18 and a second facing surface 28 of the embossed panel 10 define the area of the void 22. A protrusion 30 is formed on the opposite side of the embossed panel 10 from the indentation 16 as a result of the displacement of material caused by the embossing tool 12 forming the indentation 16 in the embossed panel 10. The void 22 could also be machined in a conventional machining process in which material is removed from the area that is to receive the flow drilling screw and if so no protrusion 30 would be formed.

Figure 3:
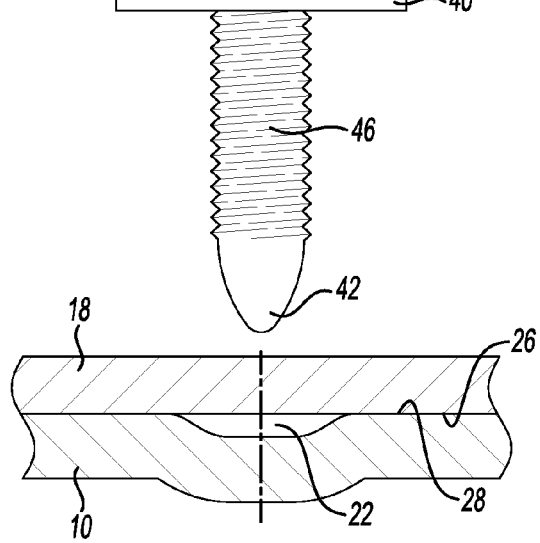
FIG. 3 is a cross-sectional view of a flow drill screw in position above two parts assembled together with a void formed by embossing the second facing surface of the second part.

Referring to FIG. 3, a flow drill screw 32 is shown to have an axis 36 that corresponds to the rotational axis of the flow drill screw 32. The flow drill screw 32 includes a head 38 and may also include a flange 40. The flange 40 increases the area on the flat panel 18 that is covered by the flow drill screw 32. A screw tip 42 is provided on the flow drill screw 32 at the end of a threaded shaft 46.

As shown in FIG. 3, the flow drill screw 32 is shown disposed with the axis 36 aligned with the void 22 formed by assembling the embossed panel 10 to a flat panel 18. The first facing surface of the flat panel 18 and the second facing surface 28 of the embossed panel 10 are shown adjacent to and engaging each other.

Figure 4:
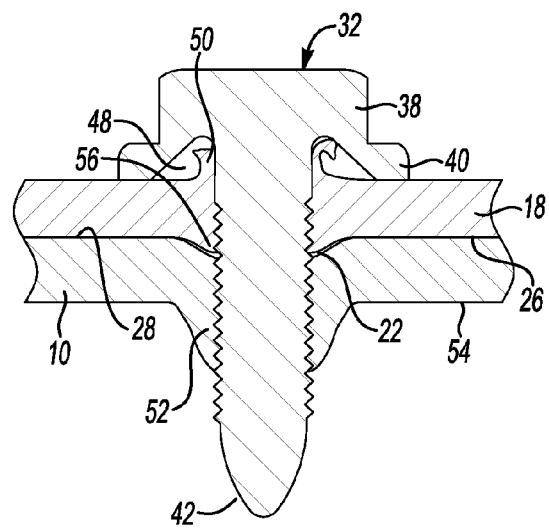
FIG. 4 is a cross-sectional view of a flow drill screw joining two parts assembled together with a void formed by embossing the second part.

Referring to FIG. 4, a cross section of the flow drill screw 32 joining the flat panel 18 and the embossed panel 10 together is shown in cross section. A flow cavity 48 is formed in the head 38 that may also extend into the flange 40 of the flow drill screw 32. The screw tip 42 of the flow drill screw 32 is shown extending outwardly from the embossed panel 10. The threaded shaft 46 of the flow drill screw 32 is shown engaging threads that are rolled into the sides of the openings formed in the panels 10 and 18 by insertion of the flow drill screw 32. Reverse flow material 50 is received within the flow cavity 48 as the flow drill screw 32 is inserted into the panels 10 and 18. Forward flow material 52 flows through the reverse side 54 of the embossed panel 10. Intermediate flow material 56 flows into the void 22 defined between the embossed panel 10 and the flat panel 18.

Figure 5:
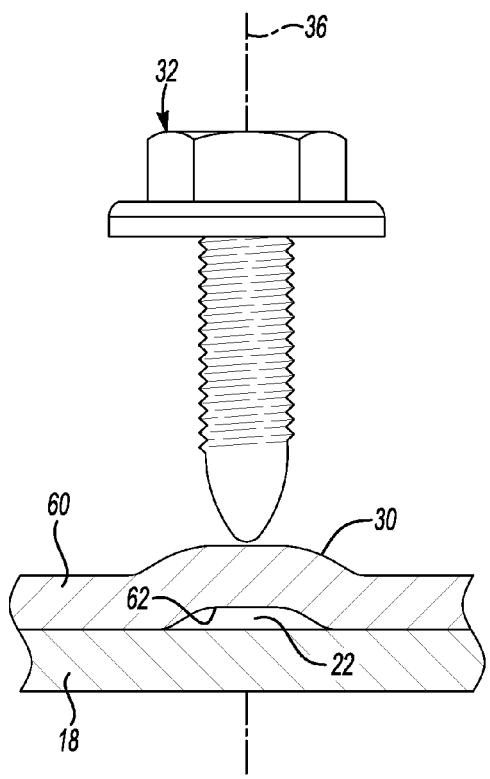
FIG. 5 is a cross-sectional view of a flow drill screw in position above two parts assembled together with a void formed by embossing the first facing surface of the upper part.
Figure 6:
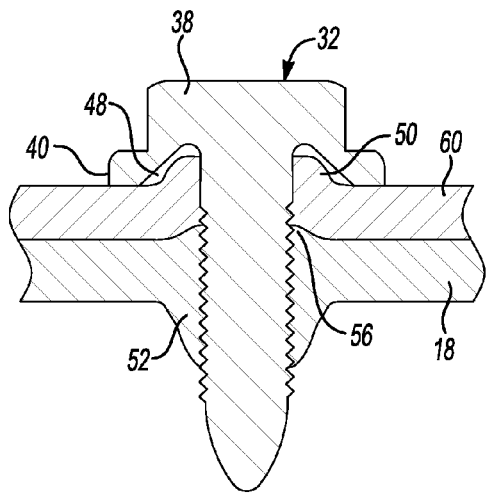
FIG. 6 is a cross-sectional view of a flow drill screw joining two parts assembled together with a void formed by embossing the upper part.

Referring to FIGS. 5 and 6, an alternative embodiment is shown in which an inverted embossed panel 60 is provided with an inverted indentation 62. The same reference numerals are used to refer to the flow drill screw 32 and the other similar elements in the embodiments of FIGS. 5-10 that were used to describe the embodiments of FIGS. 1-4.

Referring to FIG. 5, the flow drill screw 32 is shown with its axis 36 aligned with the void 22 defined by the inverted indentation 62 in the inverted embossed panel 60 and the flat panel 18.

As shown in FIG. 6, the flow drill screw 32 is shown inserted through the inverted embossed panel 60 and the flat panel 18. Reverse flow material 50 and the protrusion 30 shown in FIG. 5 are shown having been displaced into the flow cavity 48 formed by the head 38 and flange 40 of the flow drill screw 32. In the void 22, shown in FIG. 4, intermediate flow material 56 is shown that is displaced from the flat panel 18. Additional material flows as forward flow material 52 outwardly from the reverse side 54 of the flat panel 18.

Figure 7:
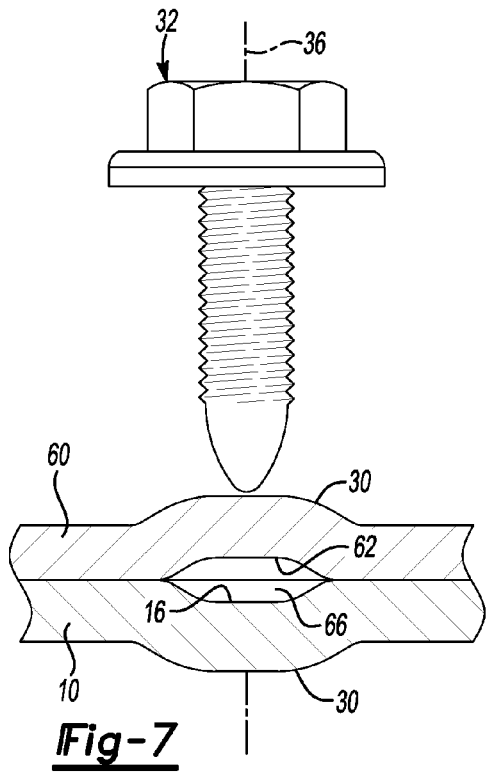
FIG. 7 is a cross-sectional view of a flow drill screw in position above two parts assembled together with a void formed by embossing the first facing surface of the upper part and the second facing surface of the second part.

Referring to FIG. 7, a flow drill screw 32 having an axis 36 is shown disposed over an inverted embossed panel 60 and a embossed panel 10. The inverted embossed panel 60 defines an inverted indentation 62. The embossed panel 10 includes an indentation 16. The indentation 16 and inverted indentation 62 together form a double void 66 between the embossed panel 10 and the inverted embossed panel 60. The protrusions 30 are formed when the indentations 62 and 16 are formed in the respective panels.

Figure 8:
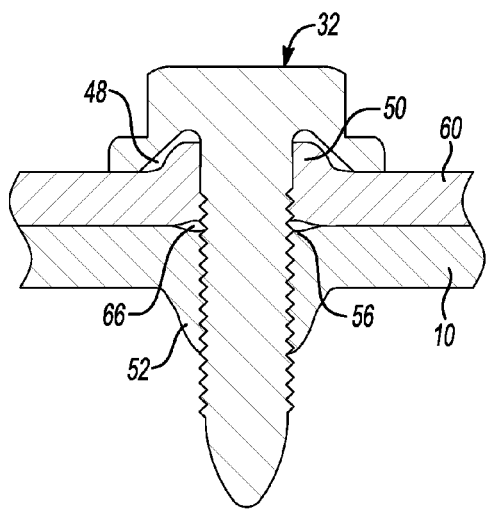
FIG. 8 is a cross-sectional view of a flow drill screw joining two parts assembled together with a void formed by embossing the first facing surface of the upper part and the second facing surface of the second part.

Referring to FIG. 8, a flow drill screw 32 is shown inserted in embossed panel 10 and inverted embossed panel 60 (shown in FIG. 7). The flow drill screw 32 is shown fully inserted through the panels 10, 60. Reverse flow material 50 is shown received within the flow cavity 48, as previously described. Forward flow material 52 is shown extending from the opposite side of the embossed panel 10. Intermediate flow material 56 flows into the double void 66.

Figure 9:
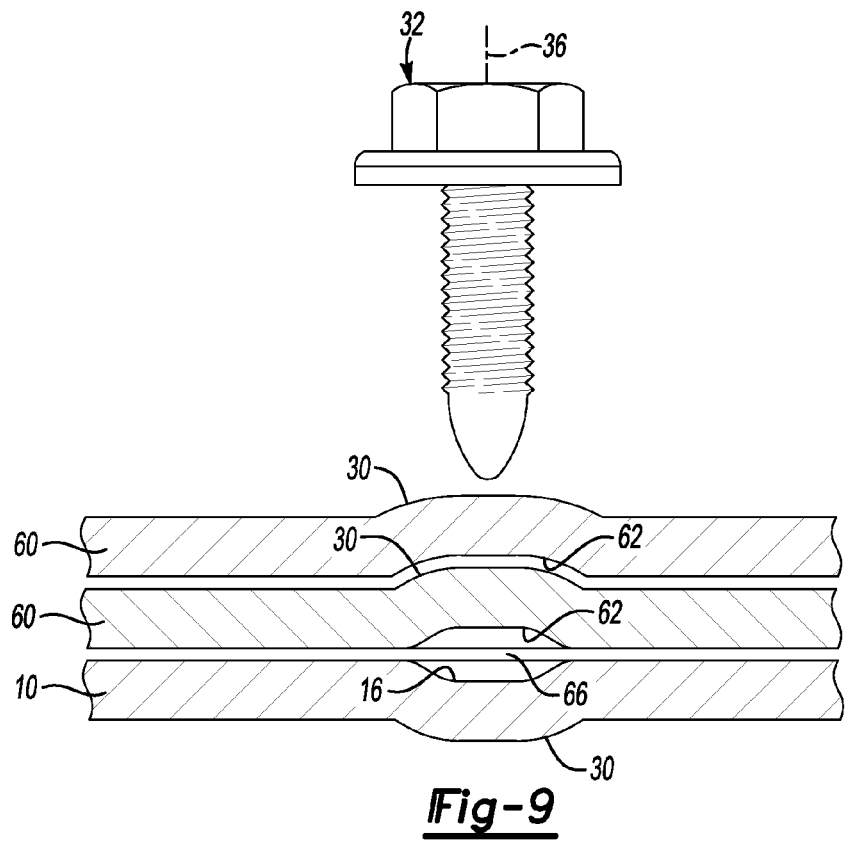
FIG. 9 is a cross-sectional view of a flow drill screw in position above three parts assembled together with a void formed by embossing the first facing surface of the upper part and the first facing surface of the intermediate part, and the second facing surface of the third part.

Referring to FIG. 9, another alternative embodiment is shown in which two inverted embossed panels 60 are shown with the protrusion 30 of the inverted embossed panel 60 being received in the inverted indentation 62 of the upper inverted embossed panel 60, as shown in FIG. 9. The embossed panel 10 is shown below the two inverted embossed panels. The flow drill screw 32 has an axis 36 that is shown aligned with the indentation 62 in the inverted embossed panel 60 and the indentation 16 in the embossed panel 10. A double void 66 is defined between the embossed panel 10 and the lower inverted embossed panel 60. When the flow drill screw 32 is inserted through the three panels shown in FIG. 9, material displaced during the flow drill screwing process accumulates in flow cavity 48 defined in the head 38 and flange 40 of the flow drill screw 32. Forward flow material 52 again is moved through the outboard side of the embossed panel 10 and material displaced during the flow screw drilling process also accumulates within the double void 66.

Figure 10:
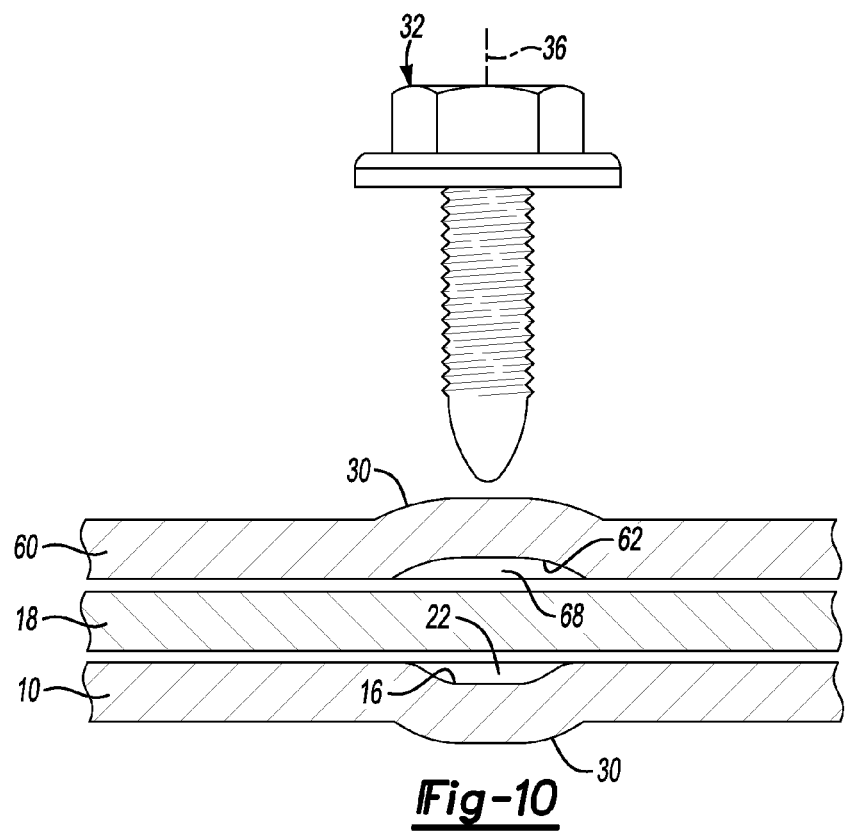
FIG. 10 is a cross-sectional view of a flow drill screw joining three parts assembled together with a void formed by embossing the first facing surface of the upper part and the second facing surface of the third part.

Referring to FIG. 10, another alternative embodiment is shown in which an inverted embossed panel 60 is assembled to a flat panel 18 and a embossed panel 10. The flow drill screw 32 has rotational axis 36 that is aligned with the void 22 defined by the indentation 16 in the embossed panel 10 and the inverted void 68 defined by inverted indentation 62 in the inverted embossed panel 60. A protrusion 30 is formed on the top of the inverted embossed panel 60. Protrusion 30 is also formed on the embossed panel 10 on the opposite side from the indentation 16.

In each of the above cases, the indentation 16 and the inverted indentation 62 define voids 22, double voids 66 or inverted voids 68 that are intended to receive material formed when the flow drill screw 32 is inserted through the panels 10, 60 without forming a pilot hole. The material accumulating in the voids 22, 66 and 68 are received in the voids and does not tend to separate the panels that the flow drill screw 32 is intended to join. According to the disclosed process, unwanted spacing or gaps between panels is avoided. While joining two panels and three panels is illustrated, it is believed that the invention may also be applicable to four or more panels and also to parts that are not sheet metal panels. For example, the process may be applied to joining a sheet metal panel to a cast part or the like without the departing from the disclosed concept.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A pre-assembly comprising:
a first plate that does not define a clearance hole;
a second plate that does not define a clearance hole; and
a flow drill screw having a central axis oriented for insertion into the first plate at a location, wherein the first plate and the second plates each define an embossed recess on an internal side that faces the other of the first plate or the second plate, the recesses cooperating to define an embossed void, wherein the central axis of the flow drill screw is axially aligned with the embossed void.

2. A pre-assembly comprising:
first and second plates each not having a clearance hole; and
a flow drill screw having a central axis oriented for insertion into the first plate, each of the plates defining an embossed indentation on an internal side facing the other of the first plate or the second plate, the embossed indentations cooperating to define a void, wherein the central axis of the flow drill screw is axially aligned with the void.

* * * * *